United States Patent Office 2,935,408
Patented May 3, 1960

2,935,408
STABILIZER FOR NON-FROZEN WATER-CONTAINING INGESTIBLE MATERIALS SUCH, FOR INSTANCE, AS FOODSTUFFS AND INTERNAL MEDICINES

Willis S. Steinitz, Oceanside, N.Y., assignor to American Food Laboratories, Inc., Brooklyn, N.Y., a corporation of New York No Drawing. Application December 13, 1957
Serial No. 702,512

The terminal portion of the term of the patent subsequent to February 11, 1975, has been disclaimed 2 Claims. (Cl. 99—129)

This invention relates to a stabilizer for non-frozen water-containing ingestible materials such as foodstuffs and internal medicines.

Many non-frozen water-containing ingestible materials of the character described contain, in addition to nutriments and water, a composition known as a stabilizer. Typical materials utilizing such a stabilizer are salad dressings, toppings, jams and jellies, sauces, gravies, cheeses, syrups, chocolate milk, pie fillings, puddings and icings. It will be observed that these include both sweet and non-sweet materials as well as fatty and non-fatty materials.

The stabilizers are employed in these various materials for many purposes. For example, one function of the stabilizers is to promote the formation of an emulsion of two or more immiscible fluids, e.g., oil-in-water or water-in-oil. It is another function of the stabilizers to maintain an emulsion once it has been formed, the stabilizers acting in this respect as a protective colloid. Still another function of the stabilizers is to promote and maintain a suspension or dispersion or intimate mixture of solids in liquid. A further function of the stabilizers is to increase the viscosity of the liquid phase, for instance, to thicken a gravy or jelly. An additional function of the stabilizers is to promote and maintain a gas-in-liquid dispersion.

It will be appreciated from the foregoing that a stabilizer is a critical constituent of comestibles of the character under discussion and even though difficulties are encountered in its incorporation into a liquid mix, these must be solved, for without stabilizers there are many commercial comestibles the manufacture of which would not be feasible on a large scale.

Actually, in practice the stabilizer has proved to be the source of more difficulty in handling than almost any other ingredient of ingestible materials of the character described. It is a principal object of the present invention to overcome this drawback.

The conventional commercial stabilizer for ingestible materials of the character described is a gum or gums. Gums are employed because of certain physical characteristics which uniquely render them able to perform the functions hereinabove set forth as stabilizers for the subject materials. The gums employed by the food industry are non-toxic, and are not the source of any disagreeable sensations. Said gums are typified by certain physical characteristics which make them useful as stabilizers; thus, they are hydrophilic, colloid-forming, water-dispersible, usually insoluble in organic liquids (a property sometimes referred to as "organic-liquid-phobic"), amorphous and chemically inert.

The gums have another physical characteristic which is the source of the prime difficulty encountered in the use of stabilizers. This is the exhibition of certain unusual properties in the presence of water. For instance some gums behave much like flour, that is to say, when added to water they "ball," or form lumps in which there is a pasty skin of the wetted gum enclosing a core of dry gum. Also, gums when wetted have a tendency to agglomerate—i.e. to clump and form soft semi-solid masses in water, which clog certain mechanisms, e.g., strainers, or cling to the walls of a container, for instance to the walls of a mixing vat. Moreover, because of their great affinity for water, there is a tendency for gums to form viscous dispersons, even when present in comparatively small percentages by weight, so that the gums are unusually difficult to add to mixes. If they are added dry, agglomeration or balling will occur, and if it is attempted to predisperse them in water they require very considerable amounts thereof, so much as often to render this method of introduction of the gum impractical.

It is an object of my invention to provide an ingestible material stabilizer which is not subject to the foregoing drawbacks.

It is another object of my invention to provide an ingestible material in which the gum is so conditioned that it can be quickly and uniformly dispersed throughout an aqueous base mix utilized in manufacturing such material.

It is another object of my invention to provide a stabilizer of the character described in which the gum is predispersed in a non-aqueous water-free liquid matrix whereby to condition it for further dispersal throughout an aqueous carrier.

It is another object of my invention to provide a stabilizer of the character described which has a fixed dispersion of solid in liquid whereby to insure a long shelf life and the ability to employ it under all kinds of conditions—i.e. on humid days, on dry days, and in either a cold or a hot liquid mix.

It is another object of my invention to provide a stabilizer of the character described which can be manufactured simply and easily and which does not noticeably increase the cost of the ultimate product.

It is another object of my invention to provide a stabilizer of the character described which does not appreciably increase the bulk of the ingestible material and which is itself relatively compact.

It is another object of my invention to provide an ingestible material and method of making the same with the use of my novel stabilizer.

In general, my invention is carried out by providing a composition which essentially includes a gum dispersed or suspended in a water-free organic liquid, and further comprises a suspension agent. The ingredients preferably are so proportioned that the composition is fluid, e.g. a thin slurry—although it is within the scope of my invention, as will be apparent hereinafter, to so increase the proportion of solids that the composition becomes semi-pasty or even pasty.

The term "gum" as used herein connotes all of the substances having the physical characteristics above mentioned, to wit: the desirable characteristics of being hydrophilic, colloid-forming, water-dispersible, organic-solvent-phobic and amorphous, as well as the undesirable characteristics of balling and/or agglomerating and/or forming thick, sticky masses even in the presence of very large quantities of water. Typical gums are tree and shrub exudations, such, for instance, as tragacanth, arabic, ghatti, and karaya; seaweed colloids such as agar, carrageen and sodium alginate; seed extracts such as locust bean, quince and guar; starches and starch derivatives— e.g. converted starches; water-dispersible cellulose derivatives—e.g. sodium carboxymethylcellulose; and pectins— such as apple pectin and citrus pectin. It will be appreciated from the foregoing that the gums either are natural or synthetic substances. It further will be understood by chemists skilled in this art that in general the gums are of indefinite composition. It also may be mentioned that my invention works equally well with hot swelling and cold swelling gums, and if heat is necessary it can be applied in the usual manner after dispersion of the stabilizer.

Any one or more of the foregoing gums can be used, in accordance with my invention, as an ingredient of a stabilizer, that is to say, from a physical point of view all of the gums are suitable. However, economics, taste, palatability, texture, viscosity, government regulations, availability, seasonal considerations, geography, and other incidental factors may be determinative of the actual gum employed in any given situation and on any specific occasion. Many of these gums are presently used as the prime, and often the only, ingredient of present-day commercial stabilizers and when they are, as has been mentioned hereinabove, they cause considerable trouble. When used alone, they invariably cake on the outer wall of the mixing vat, pony mixer, colloid mill, or comminuting machine, or they clog any strainer that may be present in the system. Moreover, due to their incomplete dispersion, they commonly require the use of considerably more of the gum than actually is necessary; even when used with bulking agents, they still retain many of the undesirable features, and particularly that of clumping.

Various methods have been proposed to avoid the undesirable side effects of stabilizers—for instance, some manufacturers mix a stabilizer with an additional inordinately large quantity of sugar or other dry constituent to aid dispersion in the liquid mix. Others try to sprinkle the stabilizer dry into a mixing vat at the point of greatest agitation. However, in none of these cases have truly satisfactory results been achieved due to the great swelling power of the gums and due to their innate tendency to create a heavy sticky mass which is completely unsuitable for admixture with a liquid mix.

The gums which I presently prefer to employ in carrying out my invention are, specifically, locust bean, karaya, carrageen, pectin, arabic, guar, and sodium carboxymethylcellulose.

The liquid carrier employed in pursuance of my invention can be any water-free organic liquid, that is to say, insofar as the physical factors are concerned, any organic liquid is acceptable which does not react chemically with the stabilizer, or any of the ingredients of the liquid mix, or the materials of any of the containers or mechanisms which come in contact with the liquid mix during or after introduction of the stabilizer. Thus, one of the requirements of the liquid is that it be chemically inert under the particular conditions prevailing in this field. The water-free organic liquid also must be non-toxic and palatable in the amount utilized. Types of water-free organic liquids having the foregoing characteristics, and therefore usable in connection with my invention, are: alcohols, such for instance as the aliphatic and polyhydric alcohols; esters, such for instance as esters of polyhydric alcohols and fatty acids; ethers; aldehydes; ketones; acids; triglycerides, essential oils; quinones; alicyclic compounds including the cyclic terpenes; hydroxypropylglycerol; and hydroxypropylsucrose. By way of example, I have secured particularly satisfactory results with ethyl alcohol, benzyl alcohol, glycerine, propylene glycol, glyceryl oleate, propylene glycol oleate, sorbitan stearate, butter oil, vegetable oil, mineral oil and fish oil. It is emphasized that, insofar as the organic liquid is concerned, the criteria are physical, i.e. that it shall be water-free, non-toxic, palatable and inert in this system. No chemical reactions or characteristics of any nature whatsoever are required or desired except inertness.

The physical makeup of the stabilizer as thus constituted—i.e. essentially comprising a gum, a water-free organic liquid, and a suspension agent—is not critical. For example, said stabilizer might be quite fluent consisting, for instance, of as little as 10% by weight of the gum, 10% by weight of the suspension agent, and 80% by weight of the liquid carrier. Nevertheless, it is more practical and economical to use higher percentages of the gum since it is the gum which performs the active functions of the stabilizer, the carrier merely serving to disperse the gum throughout the liquid mix and the suspension agent serving to hold the gum dispersed in the carrier. Hence I have used a slurry composed of as high as 40% by weight of the gum, 3% by weight of the suspension agent, and 57% by weight of the water-free organic liquid, with perfectly satisfactory results. Indeed, it is within the scope of my invention to use a stabilizer which is semi-pasty or even pasty, in which case larger amounts of the gum can be used, e.g., as high as 80% by weight of the gum, ½% by weight of the suspension agent, and 19½% by weight of the water-free organic liquid.

To make the stabilizer, it simply is necessary thoroughly to disperse the gum and suspension agent through the organic liquid. Preferably, such dispersion is aided by homogenization, this typically being effected by a fine milling step, such as ball milling or pin milling or colloid milling. The milling is performed after the gums and suspension agents have been mixed with the organic liquid. As a result a composition is made which varies in flowability from an extremely thin slurry all the way up to a paste.

A stabilizer embodying my invention can be added to a water-containing ingestible material, such as a foodstuff or internal medicine, at any state of the manufacture of such material without giving rise to the undesirable side effects of previous stabilizers hereinabove discussed at length. For example, the stabilizer can be added in the mixing vat, pony mixer, colloid mill, viscolizer, or comminuting machine, while the ingestible material is either hot or cold, or during passage of the still liquid ingestible material through pipes, homogenizers, strainers, or other apparatuses. Indeed, the stabilizer embodying my invention can be added as late in the process of making the non-frozen ingestible material as the cooling step, provided, however, that it must be added while the ingestible material still is liquid. It is not desirable to add my stabilizer after the ingestible material is thickened or set as the mixing may be destructive of the physical composition of such material.

I have observed that my new stabilizer readily disperses throughout any water-based liquid mix from which such ingestible materials are made and thereby distributes the gum evenly and uniformly through the mix, rendering all particles of the stabilizer accessible to the same degree to the water base of the mix.

Moreover, I have noted that the gum when thus treated adds all the requisite characteristics to the mix without imparting any of the undesirable characteristics. Thus there is no clumping, undesirable thickening, or balling. Indeed, as a result of the absence of these characteristics, even less of the gum can be used than now is conventionally employed, this being because full utilization is obtained of each particle of the gum.

The stabilizer is added to the liquid mix in any conventional manner. For example, if it is incorporated in a mixing bowl, it simply may be poured into the bowl, preferably at a zone of agitation. Alternatively, it can be forced into a conduit through which the liquid mix flows, it being desirable, however, that at some subsequent stage some degree of agitation should take place to insure dispersion of the stabilizer throughout the liquid mix. Such a subsequent stage may include beating, homogenization, flow at a high speed through a strainer, milling, etc., and it will be found that under such a condition, the stabilizer will disperse smoothly and with great ease.

A typical satisfactory example of a stabilizer consisting of only the basic principal ingredients of my invention is:

EXAMPLE 1

| | Oz. |
|---|---|
| Propylene glycol | 16 |
| Irish moss extract | 8½ |
| Ethyl alcohol | 2 |
| Glyceryl monostearate | 1½ |

The amount of stabilizer added to the liquid mix for any particular ingestible material is determined by the proportion of gum present in the stabilizer and the proportion of gum that is desired to be present in an ultimate mix. For example, in a chocolate fudge, it is desirable to employ a gum such as Irish moss extract in a concentration of about 0.5% by weight of the fudge. It will be apparent that since the gum is only a fraction of the stabilizer, more stabilizer than gum must be used. Thus if the gum is, as in the example given above, 8 ounces in 25½ ounces of stabilizer, a little more than three times as much of the stabilizer must be used, and in the foregoing example the total amount of stabilizer to be added would be about 1.6% by weight of the chocolate fudge.

Because different gums conventionally are present in different proportions by weight in an ingestible material, for example, refined extract of carrageen is usually more effective than sodium carboxymethylcellulose, since different manufacturers find it feasible to use different percentages of the gums, since different ingestible materials use different amounts of gums, and since the gums also will vary with the particular constituents, and the flavor and texture required, it will be appreciated that the amount of stabilizer employed or the amount of gum employed in accordance with my invention will vary widely and cannot be fixed within any specific range.

It often is advantageous to employ more than a single organic water-free liquid to aid in expediting dispersion of the stabilizers, and therefore of the gum, throughout a fluid mix from which an ingestible non-frozen material will be prepared. An example of a stabilizer so constituted is:

EXAMPLE 2

| | Oz. |
|---|---|
| Glycerine | 10 |
| Propylene glycol | 6 |
| Irish moss extract | 8 |
| Ethyl alcohol | 1 |
| Glyceryl monostearate | 1½ |

It also sometimes is desirable to have present more than a single gum in order to secure a certain selected texture. Examples of stabilizers utilizing two gums are:

EXAMPLE 3

| | Oz. |
|---|---|
| Locust bean | 7 |
| Pectin | 3 |
| Glycerine | 16 |
| Propylene glycol | 1 |
| Glyceryl monostearate | 1½ |

EXAMPLE 4

| | |
|---|---|
| Locust bean | 7½ |
| Irish moss extract | ½ |
| Glycerine | 16 |
| Proplyene glycol | 1 |
| Glyceryl monostearate | 1½ |

The inclusion of the suspension agent is, as pointed out above, a basic feature of the present invention. Predispersal of the gum in the organic water-free liquid forms in effect a suspension, but this suspension has a very strong tendency to settle, and if the gum is left beyond a certain period in the organic water-free liquid, it will settle to such an extent that if subsequently added to a water-base liquid mix for an ingestible non-frozen material, the gum will, upon contacting the water, form a sticky exterior, hard-to-handle, viscous mass. Accordingly, to prevent this from happening and to insure a very long shelf life, pursuant to my invention, I have incorporated a suspending agent. Edible esters of fatty acids are excellent for this purpose, a typical compound being glyceryl monostearate. It is desirable that the suspending agent be miscible, dispersible or soluble in the organic liquid. It furthermore is desirable to insure dispersion of both the gum and the suspension agent through the liquid organic water-free carrier, as by homogenization, milling or an equivalent step, inasmuch as this dispersion is to a large extent responsible for the excellent ultimate dispersion of the stabilizer throughout a liquid mix of ingestible material, and for the low overall time required to enable the water present in such mix to condition, i.e. act upon, e.g. swell, the gum. It also is believed that it is this dispersion which enables the stabilizer to be added to a liquid water base mix, if desired, at any time in the preparation of the mix.

Many compounds will function satisfactorily as suspension agents. The suspension agent, like the previously described ingredients of the stabilizer, i.e. the gum and the organic liquid, should be selected for its physical rather than its chemical properties. Thus said suspension agent, in addition to having the necessary physical characteristics to function as a suspension means, must be non-toxic and palatable in the quantities employed and must be chemically inert to the other ingredients of the stabilizer, the liquid mix to which the stabilizer is to be added, and the physical elements with which the mix is to come into contact.

Typical suspending agents in addition to those mentioned above are emulsifying agents and finely divided solids, said agents being, of course, like all of the other ingredients of the stabilizer, non-toxic, palatable, and chemically inert. Some suitable finely divided solids are casein, activated carbon, betonite, silica, alumina, and salts in general. Some suitable emulsifying agents are sodium stearate, potassium laurate, sodium lauryl sulfate, sodium sulfosuccinate, magnesium oleate, aluminum stearate, polyoxyethylene fatty alcohol ethers, polyglycol fatty acid esters, polyoxyethylene modified fatty acid esters, polyoxyethylene-polyol fatty acid esters, polyoxypropylene fatty alcohol esters polyoxypropylene glycol fatty acid esters, polyoxypropylene modified fatty acid esters, polyoxypropylenepolyol fatty acid esters, polyol fatty acid monoesters, lecithin, polyhydric alcohol fatty acid di-, tri-, etc. esters, polyethylene glycol (molecular weight ranging between 200 and 20,000) and fatty acid esters thereof, methyl cellulose, hydroxypropylmethyl ether of cellulose, cholesterol and fatty acid esters, lanolin, oxidized fatty oils and esters of hydroxypropylsucrose.

Additional examples of various stabilizers are the following:

EXAMPLE 5

| | Oz. |
|---|---|
| Irish moss extract | 1½ |
| Carboxymethylcellulose | 6½ |
| Glycerine | 12 |
| Propylene glycol | 6 |
| Ethyl alcohol | 2 |
| Glyceryl monostearate | 1½ |

EXAMPLE 6

| | |
|---|---|
| Locust bean | 4 |
| Irish moss extract | 4 |
| Glycerine | 12 |
| Propylene glycol | 5 |
| Ethyl alcohol | 2 |
| Glyceryl monostearate | 1½ |

EXAMPLE 7

| | |
|---|---|
| Gum tragacanth | 8 |
| Glycerine | 12 |
| Propylene glycol | 6 |
| Glyceryl monostearate | 1½ |

EXAMPLE 8

| | |
|---|---|
| Sodium carboxymethylcellulose | 6 |
| Gum arabic | 2½ |
| Glycerine | 12 |
| Propylene glycol | 5 |
| Glyceryl monostearate | 3 |

EXAMPLE 9

| | |
|---|---|
| Sodium carboxymethylcellulose | 6 |
| Gum arabic | 2½ |
| Glycerine | 12 |
| Monostearate of propylene glycol | 2½ |

By way of illustration, I have set forth below several ingestible materials of the non-frozen water base type which include my novel stabilizer, some of these being sweet and others being unsweet. It will be understood that these examples simply are by way of illustration and are not to be construed as a limitation upon my invention.

EXAMPLE I

Cooked fruit topping

| | | |
|---|---|---|
| Strawberries | lb | 680 |
| Liquid cane sugar syrup (67 Brix) | gal | 56 |
| Stabilizer (according to the present invention) | lb | 40.8 |
| Strawberry extract | oz | 27 |
| Red coloring (4% water solution) | oz | 100 |
| Citric acid solution (50%) | gal | 1 |
| Sodium benzoate | lb | 1¼ |

The syrup is heated together with the strawberries and stabilizer to 180° F., being agitated and held at this temperature for ten minutes. Then the coloring material, flavor, citric acid and preservative are added and the topping canned hot. The above formula makes about 1,360 pounds of the finished product. The stabilizer embodying my invention which preferably is used in connection with this fruit topping is made up by first preparing two liquids. One of these, called liquid A, constitutes 16 ounces of glycerine, 7 ounces of locust bean, and 3 ounces of pectin. The other solution, called B, contains two ounces of ethyl alcohol (this and all constituents hereinafter mentioned of the stabilizers are water-free), 1½ ounces of glyceryl monostearate, and 1 ounce of propylene glycol. Solution A has the gum dispersed as by milling. Solution B is heated until a clear solution is formed. Then solution B is added to solution A and then thoroughly mixed as by remilling or stirring. The mixed solutions are allowed to cool to 70° F. whereupon the stabilizer is ready to be added to the topping.

EXAMPLE II

Chocolate fudge

| | | |
|---|---|---|
| Premix | lb | 6⅝ |
| Water | gal | 31¾ |
| Liquid cane sugar syrup (67 Brix) | gal | 60½ |
| Corn syrup solids | lb | 146 |
| Cocoa | lb | 135 |
| Butter | lb | 40 |
| Sweetened condensed milk | lb | 13½ |
| Stabilizer (according to the present invention) | lb | 12 |

All the ingredients with the exception of the sweetened condensed milk are added to the water in a vat and are heated to 180° F., the temperature being maintained for ten minutes. Then the milk is added, the mixture stirred up again, and canned hot.

The above premix constitutes two pounds of salt, 3¼ pounds of vanilla sugar, and 1¼ pounds of sodium benzoate, which are mixed together dry. The liquid stabilizer used in Example II consists of solutions A and B, solution A constituting 12 ounces of glycerine and 8 ounces of Irish moss extract, which is pin milled with the glycerine for proper dispersion. Solution B consists of 2 ounces of ethyl alcohol, 1½ ounces of glyceryl monostearate, and 6 ounces of propylene glycol. As in Example I, solution B has its constituents heated until the same is clear, and then is added to solution A and agitated and allowed to cool to 70° F.

EXAMPLE III

Chocolate milk

| | | |
|---|---|---|
| Premix | lb | 9 |
| Cane sugar | lb | 25 |
| Stabilizer (according to the present invention) | oz | 10 |
| Whole milk—sufficient to make up to 50 gal. | | |

The premix constitutes the following constituents in the following proportions:

| | | |
|---|---|---|
| Cocoa | lb | 5½ |
| Salt | lb | ¼ |
| Vanilla sugar | lb | ½ |
| Cane sugar | lb | 2¼ |
| Corn sugar | lb | ½ |

The ingredients of the premix are mixed together dry. Then the premix, cane sugar, and liquid stabilizer are added to the milk to form a liquid mixture that is pasteurized at 160° F. for twenty minutes. Thereafter the liquid mix is cooled to 50° F. and bottled. The liquid stabilizer utilized in Example III consists of solutions A and B, which are prepared in the same manner as heretofore outlined in Examples I and II but constitute the following constituents: Solution A includes 12 ounces of glycerine and 8 ounces of Irish moss extract; solution B includes 2 ounces of ethyl alcohol, 1½ ounces of glyceryl monostearate, and 6 ounces of propylene glycol.

EXAMPLE IV

Pie filling

| | |
|---|---|
| Blueberries | 4 cups. |
| Sugar | 1 cup. |
| Salt | ⅛ of a teaspoon. |
| Lemon extract | ½ of a teaspoon. |
| Stabilizer (according to the present invention) | 2 ounces. |

The sugar, liquid stabilizer, lemon extract and salt are combined. Then the berries are picked, washed and drained. Half of the sugar mixture is placed on the bottom of a pie shell, the berries are superimposed thereon, and the rest of the mixture is placed on the top. If desired, a crust cover can be located over the upper half of the sugar mixture. The pie is placed in an oven and baked at about 425° F. for forty to fifty minutes.

The liquid stabilizer again is made from two solutions in the same manner as heretofore described. Solution A includes 16 ounces of glycerine, 7½ ounces of locust bean, and ½ ounce of Irish moss extract. Solution B consists of two ounces of ethyl alcohol, 1½ ounces of glyceryl monostearate, and 1 ounce of propylene glycol.

Thus Example IV illustrates the manner in which my novel liquid stabilizer can be utilized even in conjunction with ingredients of an ingestible material which, although basically water-containing, initially consists entirely of solid ingredients, the water only being provided at a subsequent stage, here by release during the cooking process. The stabilizer is so readily dispersible that despite the absence of agitation, the stabilizer spreads throughout the ingredients of the pie filling, and eventually the gum contained in the stabilizer is acted upon by the water present in the blueberries to form a thickening that lends the proper body to the filling.

EXAMPLE V

Processed fruit product

| | | |
|---|---|---|
| Strawberries | lb | 110 |
| Sugar | lb | 80 |
| Stabilizer (according to the present invention) | lb | 4 |
| Citric acid solution (50%) | fluid oz | 10 |

The strawberries and citric acid solution are placed in a heavy kettle and heated to boiling. Then the sugar is added and the mix stirred until the sugar dissolved. Thereafter the stabilizer is added, the mix being stirred during such addition. Finally, the mix is cooked for ten to twenty minutes or until thick, being constantly stirred to prevent scorching. The stabilizer is made in the usual manner above described. Solution A consists of 12 ounces of glycerine, 1½ ounces of Irish moss extract, and 6½ ounces of sodium carboxymethylcellulose. Solution B consists of 2 ounces of ethyl alcohol, 1½ ounces of glyceryl monostearate, and 6 ounces of propylene glycol.

EXAMPLE VI

Barbecue sauce

| | | |
|---|---|---|
| Water | gal | 4¼ |
| Stabilizer (according to the present invention) | lb | 2 |
| Prepared mustard | oz | 8 |
| Tobasco sauce | oz | 1 |
| Tomato puree | oz | 6 |
| Cane sugar | oz | 6 |
| Worcestershire sauce | oz | 2 |
| Chili powder | oz | 2 |
| Red pepper | oz | ¾ |
| Black pepper | oz | ¾ |
| Paprika | oz | 2 |
| Salt | oz | 3 |
| Vinegar | pints | 2 |
| Butter | lb | 4 |
| Powdered onion | oz | ⅓ |
| Powdered garlic | oz | ⅓ |

The water is heated, the liquid stabilizer added to it and thoroughly agitated as in a pony mixer, then the balance of the ingredients are added and also mixed. Thereafter the liquid mix is heated to the boiling point and canned hot. Subsequently, the cans are pasteurized. The stabilizer is made of two separate solutions in the same manner as has been set forth heretofore. Solution A consists of 12 ounces of glycerine, 4 ounces of locust bean, and 4 ounces of Irish moss extract. Solution B consists of 2 ounces of ethyl alcohol, 1½ ounces of glyceryl monostearate, and 5 ounces of propylene glycol.

EXAMPLE VII

Worcestershire sauce

| | | |
|---|---|---|
| Vinegar | gal | 17 |
| Mushroom catsup | gal | 10 |
| Walnut flavor | oz | 8 |
| Soy sauce | oz | 6 |
| Sherry wine | gal | 5 |
| Black strap molasses | gal | 2½ |
| Salt | lb | 11 |
| Brown sugar | lb | 20 |
| Tamarinds | lb | 10 |
| Onion powder | lb | 2 |
| Garlic powder | lb | ¼ |
| Ground anchovies | lb | 21 |
| Stabilizer (according to the present invention) | lb | 2 |
| Cayenne pepper | lb | 1 |
| Black pepper | lb | 1 |
| Lovage root | oz | ⅛ |
| Allspice | lb | 1 |
| Cloves | oz | ⅛ |
| Cinnamon | oz | ⅛ |
| Mace | oz | 7 |
| Nutmeg | lb | 3 |
| Ginger | lb | 1 |
| Lemon peel | lb | 2 |

The spices are allowed to soak in the vinegar about 4 hours. Then the rest of the ingredients are added and the entire mix agitated for about 1 hour. Finally, the mixture is strained to remove large particles and bottled or barreled. The foregoing liquid stabilizer used in this Example VII, like the other stabilizers, is made from two solutions in the same manner as has been detailed hereinabove. Solution A consists of 12 ounces of glycerine and 8 ounces of gum tragacanth. Solution B consists of 2 ounces of ethyl alcohol, 1½ ounces of glyceryl monostearate, and 6 ounces of propylene glycol.

EXAMPLE VIII

French dressing

| | | |
|---|---|---|
| Cotton seed oil | lb | 3 |
| Water | lb | 1 |
| Vinegar | lb | 2 |
| Salt | oz | 3 |
| Pepper | oz | ½ |
| Paprika | oz | ½ |
| Stabilizer (according to the present invention) | oz | 3½ |

In addition to the foregoing any one or more of the following spices may be added to provide a taste which the manufacturer considers suitable for consumer demand: garlic, celery seed, horse radish, onion juice, dry mustard, tarragon vinegar, chile sauce, tomato catsup, Worcestershire sauce, cayenne, and curry powder.

All the ingredients except the water and vinegar are mixed together and then while the mixture is being severely stirred, the vinegar and water are allowed to flow in slowly.

I have prepared two stabilizers which function excellently in the above French dressing. These stabilizers constitute good examples of other modifications of my invention.

The first of the aforesaid stabilizers is characterized by the utilization of an oily, rather than a non-oily water-free organic liquid for a carrier, and constitutes 16 ounces of corn oil, 1½ ounces of Irish moss extract, 6½ ounces of carboxymethylcellulose, 2 ounces of ethyl alcohol, ½ ounce of glyceryl monostearate, and 6 ounces of propylene glycol. In making the stabilizer, first I prepare a composition consisting of the Irish moss extract and carboxymethylcellulose dispersed in the corn oil as by ball milling. Then I prepare a second composition by heating the glyceryl monostearate and propylene glycol to the point where the glyceryl monostearate dissolves. Thereafter, I add the ethyl alcohol to the second composition. Now the two compositions are brought together, mixed thoroughly as by milling, and allowed to cool to below 70° F.

The second stabilizer is characterized by the presence of an organic-liquid-soluble, synthetic gum, employed as a suspension agent, to wit, hydroxypropyl methyl cellulose. Such stabilizer includes 16 ounces of propylene glycol, 8 ounces of carboxymethylcellulose, and ¼ ounce of hydroxypropyl methyl cellulose of 25 centipoises viscosity and having a 60° C. gel point for a 2% aqueous solution. To make up the stabilizer the propylene glycol is heated to 140° C. and the hydroxypropyl methyl cellulose thereupon dissolved therein. Then the solution is cooled to 25° C. and the carboxymethylcellulose dispersed therein under agitation as by ball milling.

If desired, the second stabilizer can be modified to substitute benzyl alcohol weight for weight for the propylene glycol, and methyl cellulose of 25 centipoises viscosity weight for weight for the hydroxypropyl methyl cellulose. The methyl cellulose will dissolve in cold benzyl alcohol so that the heating step is omitted.

EXAMPLE IX

Laxative

A first solution is made up of 12 ounces of glycerine and 8 ounces of carboxymethylcellulose, this solution having the gum thoroughly dispersed throughout the glycerine as by milling. Then a second solution is prepared of two ounces of ethyl alcohol, 1½ ounces of glyceryl monostearate, and 6 ounces of propylene glycol. The second solution is heated until the glyceryl monostearate is melted. Then the second solution is added to the first and again mixed thoroughly, milling optionally being employed, and the combined solutions are allowed to cool to below 70° F. These combined solutions will be recognized as a stabilizer in accordance with my invention. The stabilizer itself in this instance may constitute the ingestible material. Optionally, it may have added to it any well known active medicament, or it may be diluted with water to any extent desired. Preferably, however, it is given to a patient without the addition of any water, and after ingestion it will mix with the water base fluids in the alimentary canal to form a mobile soft mass which acts as a bulk laxative.

EXAMPLE X

*Modified barbecue sauce*

All of the ingredients set forth in Example VI are employed except that a different stabilizer is substituted for the stabilizer set forth in said example. The alternative stabilizer consists of solutions A and B. Solution A consists of 12 ounces of glycerine, 4 ounces of Irish moss extract, 4 ounces of locust bean, and 0.8 ounce of lecithin. Solution B consists of two ounces of ethyl alcohol, 1¼ ounces of glyceryl monostearate, and 5 ounces of propylene glycol. The lecithin is added to the Irish moss extract and locust bean in a dry ball mill. Thereafter the mixture of all the gums are added to the glycerine in a wet ball mill, whereby to thoroughly disperse the gums throughout their water-free organic liquid carrier. Now solution B is heated until the glyceryl monostearate is dissolved. Finally, the two solutions are mixed together and cooled to below 70° F.

EXAMPLE XI

*Fruit topping*

All of the ingredients set forth in Example I are employed except for a substitute stabilizer embodying the present invention. Instead of the stabilizer originally specified, I use three solutions, the first of which consists of 12 ounces of glycerine, 4 ounces of Irish moss extract, and 4 ounces of locust bean. The second solution consists of ⅟₁₀ of 1 ounce of methyl cellulose (100 centipoises), and 4 ounces benzyl alcohol. The third solution consists of 2 ounces of propylene glycol and ½ ounce of glyceryl monostearate. The first solution is prepared as by milling so as to disperse the gums in the glycerine. The second solution is prepared by simply allowing the methyl cellulose to dissolve in the benzyl alcohol without heating. The third solution is prepared by heating until the glyceryl monostearate dissolves in the propylene glycol. Next, the first and third solutions are mixed together and then cooled to below 70° F. Finally, the second solution is added and mixed in together with the already mixed first and third solutions.

My stabilizer can be used in connection with water-base comestible materials packed under pressure, e.g., a pressure bomb containing a whipped cream mixture and a gas, such as carbon dioxide. I have observed that my stabilizer functions with equal ease in maintaining good dispersion of the gas phase in the liquid phase, and also acts properly after expulsion of the whipped product.

Typical of such use are:

EXAMPLE XII

*Pseudo whip cream pressure package*

| | Pounds |
|---|---|
| Butter fat | 30 |
| Mild solids, non-fat | 8¼ |
| Cane sugar | 5 |
| Glyceryl monostearate | ¼ |
| Stabilizer (according to the present invention as per Example 5) | ½ |
| Water | 56 |

All of the materials are mixed and pasteurized and then a conventional amount thereof with a conventional propellant gas or gases is introduced into a pressure package of the usual bomb type having a valve and dispersing spout. For example, a twelve ounce standard metal container is filled with seven ounces of the aforesaid liquid and the space thereabove is charged with nitrous oxide under pressure. My stabilizer under these conditions acts to maintain a proper dispersion of the fat and milk solids in water and also exercises the usual stabilizing effect after the cream has been aerated upon discharge from the container. In addition, the stabilizer tends to minimize the amount of shaking required in order to create a proper dispersion of gas and liquid prior to ejection of the gas and liquid from the container.

EXAMPLE XIII

*Whip cream pressure package*

| | Lb. |
|---|---|
| Cold pasteurized cream | 100 |
| Cane sugar | 5 |
| Stabilizer (according to the present invention as per Example 6) | ½ |

The foregoing material is packaged in pressure containers in the same manner as set forth in Example XII, the same gas being used.

It may be mentioned that the term carboxymethylcellulose as used herein always refers to the commercially available product which actually is a salt of carboxymethylcellulose, to wit, sodium carboxymethylcellulose.

It thus will be seen that I have provided a stabilizer for non-frozen water-containing ingestible materials such, for instance, as foodstuffs and internal medicines, which achieves the various objects of my invention and is well adapted to meet the conditions of practical use.

As various possible embodiments might be made of the above invention and as various changes might be made in the embodiments above set forth, it is to be understood that all matter herein described is to be interpreted as illustrative and not in a limiting sense.

Having thus described my invention, I claim as new and desire to secure by Letters Patent:

1. A stabilizer for non-frozen water-containing ingestible materials, said stabilizer wholly consisting of non-toxic, palatable, chemically inert ingestible ingredients and essentially comprising from ten percent to eighty percent by weight of a gum, from nineteen and one-half percent to eighty percent by weight of a water-free organic liquid in which the gum is suspended, and from one-half percent to ten percent by weight of a suspension agent maintaining the gum suspended in said liquid.

2. A non-frozen water-containing ingestible material including a stabilizer such as set forth in claim 1.

References Cited in the file of this patent

UNITED STATES PATENTS

| 2,435,682 | Getz | Feb. 10, 1948 |
| 2,772,168 | King | Nov. 27, 1956 |
| 2,821,480 | Hilker | Jan. 28, 1958 |
| 2,823,129 | Steinitz | Feb. 11, 1958 |